Patented Aug. 4, 1953

2,647,874

UNITED STATES PATENT OFFICE 2,647,874

AUTOMOTIVE COOLANT

Ettore Da Fano, Raritan, N. J., assignor to John B. Pierce Foundation, New York, N. Y., a corporation of New York No Drawing. Application February 18, 1950, Serial No. 145,083. In Great Britain May 26, 1949

7 Claims. (Cl. 252—78)

This invention relates to preparation of a heat transfer fluid which is especially adapted for use as a coolant in automobile radiators, and to the resulting fluid-mixture of organic isoalkyl aryl orthosilicates.

The Johnston U. S. Patent No. 2,335,012 discloses tetraaryl orthosilicates and their preparation. It also discloses mixtures of various tetraaryl orthosilicates with tetraalkyl orthosilicates.

A heat transfer fluid for automobile or the like cooling systems should be free flowing and stable up to a temperature of at least about 375° F., down to the lowest atmospheric temperature encountered in service. In addition, it should be resistant toward hydrolysis in the presence of water.

Tetraaryl orthosilicates are unstable toward hydrolysis in the presence of water. Moreover, the hydrolyzed products are insoluble, so that this instability may quite readily lead to clogging of the cooling system of an automobile containing such a fluid, if a small amount of water were present when the fluid were added, or if the water were subsequently added by mistake or through condensation. Since it is extremely difficult or practically impossible to remove the hydrolysis product formed when the orthosilicates are so decomposed, the automobile radiator and engine block may be ruined thereby.

It has been found in accordance with the invention that a composition consisting essentially of isoalkyl aryl orthosilicates has the desired stability and fluidity up to about 375° F. and low temperature fluidity. These silicates can be proportioned to have any desired fluidity at temperatures as low as −100° F. In addition they are not objectionably unstable toward hydrolysis in the presence of water, and therefore such a mixture is an ideal heat transfer fluid for an automobile cooling system. Any aryl radical may be used. The isoalkyl radical has a small number of carbon atoms, generally less than about 6, and preferably is an isopropyl or isobutyl radical. There may be one or more different isoalkyl and/or aryl radicals in the mixture.

It has been observed that at elevated temperatures any mixture of organic orthosilicates tends to disproportionate due to interchange of the organic radicals, and at equilibrium the various possible compounds will be present in certain relative proportions. To reduce the amount or concentration of the undesirable compounds, i. e. those which decompose in water to form objectionable hydrolysates, the relative proportion of the organic groups which do not display this effect should be very high.

In order to understand the relation of the various organic groups, reference may be had to the preparation of the mixture of orthosilicates, which may be represented as follows:

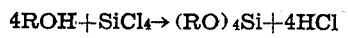

where R is aryl or isoalkyl. If the organic reactant is a mixture, the R may be represented as a mixture of R' and R'', where R' is a lower isoalkyl radical and R'' is an aromatic radical. The following compounds are possible when only one isoalkyl and one aryl radical are present:

1. Tetraisoalkyl orthosilicate

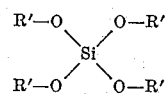

2. Triisoalkylaryl orthosilicate

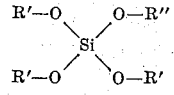

3. Diisoalkyldiaryl orthosilicate

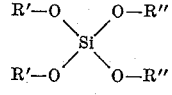

4. Isoalkyltriaryl orthosilicate

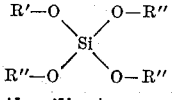

5. Tetraaryl orthosilicate

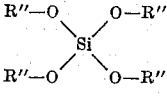

Further details on the preparation of organic orthosilicates and mixtures thereof may be found in my copending application Serial No. 44,617, filed August 17, 1948.

The ratio of the number of aryl radicals R'' (based on their gram radical weights) to the number of isoalkyl radicals R' (based on their gram radical weights) in the orthosilicates of the mixture should be such that the disproportionated equilibrium mixture will have the desired stability against hydrolysis in the presence of water and also the desired fluidity at low temperatures, for example, a mixture of:

50% triisopropylphenyl silicate and
50% diisopropyldiphenyl silicate disproportionates to the following mixture:

5.8% tetraisopropyl orthosilicate
37.1% triisopropylphenyl orthosilicate
36.9% diisopropyldiphenyl orthosilicate
17.5% isopropyltriphenyl orthosilicate
2.7% tetraphenyl orthosilicate This equilibrium mixture does not have the desired stability against hydrolysis in the presence of water, and this is thought to be due to the presence of too high a proportion of phenyl radicals, particularly in the last two mentioned compounds.

The following proportions of aryl and isoalkyl radicals in a mixture of the silicates fall within the requirements of the invention and are found to have the desired fluidity or low viscosity at low temperatures and also the desired stability against hydrolysis in the presence of water:

*Ratio of radicals (based on their gram radical weights)*

| Example No. | R' (isoalkyl) | R'' (aryl) | SiO₄ (silicate) |
|---|---|---|---|
| (1) | 15 | 1 | 4 |
| (2) | 14 | 2 | 4 |
| (3) | 13 | 3 | 4 |
| (4) | 12 | 4 | 4 |

In the above case one or more isoalkyl and/or aryl radicals may be present. Any aryl radical may be used, such as the phenyl radical, which may contain one or more substituents, such as methyl, ethyl, propyl, isopropyl, and the like alkyl or other groups. Mixtures of phenyl or substituted phenyl or other aryl radicals may be present, providing the overall mixture has the desired fluidity and stability properties. Within the above limits the aryl radical does not appear to be critical.

The isoalkyl radical may be isopropyl, isobutyl, sec-butyl, isoamyl, isohexyl, sec-amyl, a mixture of isopropyl and isobutyl, a mixture of isopropyl and sec-butyl, and like mixtures of other isoalkyl radicals. Radicals having fewer than 6 carbon atoms with a branch in the carbon chain close to the carbon affixed to the oxysilicon group are preferred.

When the isoalkyl radical is the isopropyl radical, the composition varies in properties somewhat depending on the proportions within the above range. All of these proportions give such high temperature stability as is needed in an automotive coolant. The higher the proportion of isopropyl radicals, the greater is the resistance to hydrolysis but the higher is the freezing point. For example, Examples Nos. 1 and 2, which have the best resistance to hydrolysis, have freezing points (incipient crystallization on cooling to form a pumpable mixture of crystals and liquid) of about −22° to −30° F. Example 4, on the other hand, has a much lower freezing point, but represents the maximum amount of the aryl radical to be suitable against hydrolysis. The proportions will be selected with these two properties in mind. In climates where temperatures never go below about −25° F., Examples Nos. 1 and 2 are preferable because of their superior resistance to hydrolysis. Example No. 3 is a reasonable compromise in that it has a freezing point of −70° F. and a cloud point (the temperature at which on heating the mixture cloudiness disappears) of −22° F. and satisfactory resistance to hydrolysis for most purposes.

In order to avoid the necessity of such a compromise in cases where one of the above compositions will not meet the needs, a mixture of isopropyl radicals with isobutyl radicals is desirable. Such a mixture has every desirable property including a very low freezing point. This may be due to the still greater number of compounds present upon disproportionation or equilibrium. Any proportion of isopropyl and isobutyl radicals may be used. Economics suggests that the isobutyl alcohol would not be substituted for the isopropyl alcohol entirely and would not be used in a larger proportion than necessary because of its higher cost. A satisfactory composition is as follows:

*Radicals (gram radical weights)*

| Example No. | R' (isobutyl) | R' (isopropyl) | R'' (aryl) | SiO₄ (silicate) |
|---|---|---|---|---|
| (5) | 4 | 11 | 1 | 4 |

This is to be compared with Example No. 1 except that a part of the isopropyl is replaced by isobutyl. It has the excellent hydrolysis resistance of Example No. 1, but has a cloud point of −65° F., and a freezing point so low that it has not been reached by cooling methods readily available. Similar benefits are obtainable by mixtures of isopropyl and other isoalkyl radicals, such as sec-butyl or isoamyl.

The desired heat transfer fluid for use as a coolant in an automobile may be made (1) by reacting SiCl₄ with the desired mixture of an isoalkyl alcohol or alcohols and a phenol, or (2) by mixing the tetraisoalkyl orthosilicate with a diisoalkyldiaryl orthosilicate, or by mixing tetraisoalkyl orthosilicate with tetraaryl orthosilicate in corresponding proportions, and then carrying out the disproportionation reaction.

In the method (1) of making the silicates from the starting alcohols or phenols and the silicon tetrachloride, it is preferred that the reaction be conducted out of contact with iron, since experience indicates that the presence of iron has a deleterious effect on the yield. The isopropanol and/or isobutanol and phenol are reacted with silicon tetrachloride in the desired proportions, preferably using an excess of the alcohol and of the phenol. The mixture of alcohol and phenol may be added gradually to the silicon tetrachloride, with agitation. The reaction is endothermic. After all the reactants are mixed, the reaction mixture is heated to drive off the residual by-product hydrogen chloride.

Alternatively, the silicon tetrachloride may be added gradually to the mixture of alcohol and phenol, with agitation. In this procedure, during the first half of the addition, the reaction seems to be exothermic and no hydrogen chloride is evolved. However, during the second half of the addition, hydrogen chloride is evolved and the overall reaction is endothermic.

Near the end of the reaction metallic sodium or a sodium compound of one or both of the two alcohols (sodium alcoholate) may be added, and this assists in bringing the reaction to completion and in removing the last traces of chlorinated compounds.

The reactants may be pure, or technical grade materials may be used. The alcohol may contain up to 2½% water; and in this case, certain polymers will be formed, but their presence does not seem harmful since they do not materially affect the stability of the mixture against hydrolysis in the presence of water, and they tend to lower the solidification point of the mixture.

The following general method (1) may be used for preparing Examples Nos. (1) to (5):

The equipment consists of a mechanically agitated reactor which can be heated or cooled at will; an adequate condenser or system of condensers suitable for both reflux and distillation; an acid absorbing trap; an alcohol trap to absorb and react with any entrained $SiCl_4$; a system of drying towers to prevent moisture from entering the reaction chamber; and a means of adding $SiCl_4$.

The reaction vessel is charged with isopropanol and/or isobutanol and phenol and the mixture is agitated to insure the solution of the phenol. The condenser is now connected, for reflux, to the acid absorber through the alcohol trap which contains 10% excess of the total combined weights of the alcohols. The drying towers are placed so that no moisture can enter the system from the alcohol trap to the $SiCl_4$ addition container.

The reactor is now cooled to between 0°–5° C., at which point the $SiCl_4$ is added at such a rate that the pot temperature does not exceed 25° C. The reaction, for the first half, is exothermic, mainly due to the heats of formation and solution of HCl, the main by-product; the second half, which is endothermic, due to the heat of dissolution of HCl, begins when the temperature is such that HCl is no longer being dissolved in the reaction mixture. This point is usually reached when slightly more than half of the $SiCl_4$ has been added. A small amount of $H_2O$ insoluble gas (propylene-like odor) comes over in conjunction with the HCl evolution.

The addition of $SiCl_4$ takes from 4½ to 6½ hours, depending on the amounts and the efficiency of the cooling system and the capacity of the HCl absorber. After the endothermic phase of the reaction begins the $SiCl_4$ rate of addition can be speeded appreciably.

When the $SiCl_4$ has all been added, the reactor cooling system is stopped. The liquid is brought slowly to room temperature and then heated to expel all HCl (ca. 125° C.). The reaction mixture is then allowed to reflux for at least ten (10) hours, but preferably longer.

The condenser is now arranged for distillation, and the unreacted materials are stripped off. The reactor is allowed to cool.

If desired, 10% excess alcohols may be added, and the whole brought to reflux. After refluxing for 12 hours, or more, the excess alcohols are stripped off. The volume of alcohols stripped off at this point may be less than the original volume.

After the reaction is complete, the reaction mixture is washed with water until the water phase is neutral to litmus. The liquid is then dried over "Drierite" ($CaSO_4$) and filtered. The resultant silicate is a clear straw liquid of pleasant odor. The yield is between 90–95 per cent of theory.

The other method (2) is based on radical interchange. Amounts of pure isoalkyl silicates and aryl silicates (or amounts of mixed compounds) to give the desired proportion of isoalkyl and aryl radicals are mixed together and caused to transesterify or disproportionate. This reaction is slow in the absence of a catalyst. However, in the presence of a catalyst the reaction goes to completion in the order of a day at elevated temperatures under reflux. Catalysts for the transesterification reaction include compounds which contain chlorine linked directly to silicon and which readily decompose on contact with water, such as monochlorosilicates of isopropyl alcohol, isobutyl alcohol or phenol, analogous di- and trichlorosilicates or silicon oxychlorides such as hexachlorodisiloxane. After the reaction is complete, the catalyst may be removed by washing.

It is important to note that the automotive coolant does not need to be distilled, except for topping off the excess alcohols used. The material is sufficiently purified by washing it thoroughly with water, using one of the washing devices already used for similar purposes. Three washings are recommended. The first water hydrolyzes and removes any chlorosilicate present, either because it was formed by the synthesis or because it was added as a catalyst. Gelatinous silicic acid deposits on the interface between water and silicate. It is easily removed by separation in a device of the general shape of a separatory funnel. At the same time some dark colored impurities contained in the crude material are removed and the resulting liquid is much lighter in color than the crude material. The wash water on which the silicate floats is acid because of HCl. After the second washing, the water is practically neutral but may occasionally contain small amounts of acid. A third washing assures neutrality. Because of the resistance of the composition to hydrolysis, there is no deleterious effect due to washing. After the washing the material should be filtered.

All parts and percentages in the specification and claims are by weight.

I claim:

1. A composition suitable for use as an automotive coolant, consisting essentially of a mixture of isoalkyl orthosilicates, mononuclear hydrocarbon aryl orthosilicates and mixed mononuclear hydrocarbon aryl isoalkyl orthosilicates, in proportions such that the mixture has 12 to 15 isoalkyl radicals and 4 to 1 mononuclear hydrocarbon aryl radicals for each 4 silicate radicals, said isoalkyl radical having less than 6 carbon atoms.

2. A composition in accordance with claim 1 in which the isoalkyl radical is the isopropyl radical.

3. A composition in accordance with claim 1 in which the isoalkyl radical is the isopropyl radical and the mononuclear aryl radical is the phenyl radical.

4. A composition in accordance with claim 1 in which the aryl radical is the phenyl radical.

5. A composition in accordance with claim 1 in which the isoalkyl radical is a mixture of isopropyl and isobutyl radicals.

6. A composition in accordance with claim 1 in which the isoalkyl radical is a mixture of isopropyl and isobutyl radicals and the mononuclear aryl radical is the phenyl radical.

7. A composition in accordance with claim 5 in which the isopropyl radicals and the isobutyl radicals are in the proportion of 11 to 4 gram radical weights.

ETTORE DA FANO.

References Cited in the file of this patent

UNITED STATES PATENTS

| Number | Name | Date |
|---|---|---|
| 2,053,474 | Graves | Sept. 8, 1936 |
| 2,335,012 | Johnston | Nov. 23, 1943 |
| 2,566,365 | Pedlow, Jr. | Sept. 4, 1951 |